United States Patent [19]

Sekiguchi et al.

[11] Patent Number: 5,313,895
[45] Date of Patent: May 24, 1994

[54] METHOD OF INHIBITING FORMATION OF UNBURNED SUBSTANCES IN REFUSE INCINERATOR, AND REFUSE INCINERATOR

[75] Inventors: Yoshitoshi Sekiguchi; Kunio Saski, both of Kyoto; Noboru Okigami, Osaka; Kohei Hamabe, Nara; Kazuo Ieyama, Osaka; Mamoru Knodo, Nara, all of Japan

[73] Assignee: Hitachi Zosen Corporation, Osaka, Japan

[21] Appl. No.: 27,574

[22] Filed: Mar. 5, 1993

Related U.S. Application Data

[63] Continuation of Ser. No. 795,871, Nov. 19, 1991, abandoned.

[30] Foreign Application Priority Data

Nov. 22, 1990 [JP] Japan .................................. 2-319887
Nov. 22, 1990 [JP] Japan .................................. 2-319888

[51] Int. Cl.⁵ ............................................ F23G 5/00
[52] U.S. Cl. ..................................... 110/346; 110/214; 110/215; 110/297; 110/314; 110/348
[58] Field of Search ............... 110/348, 346, 315, 305, 110/297, 300, 214, 215

[56] References Cited

U.S. PATENT DOCUMENTS

| | | | |
|---|---|---|---|
| 3,286,666 | 11/1966 | Ohlsson | 110/264 |
| 4,056,068 | 11/1977 | Hafeli | 110/345 |
| 4,060,041 | 11/1977 | Sowards | 110/264 X |
| 4,823,710 | 4/1989 | Garrido et al. | 110/297 X |
| 4,867,079 | 9/1989 | Shang et al. | 110/264 |
| 4,917,026 | 4/1990 | Greenough | 110/345 X |

FOREIGN PATENT DOCUMENTS

| | | | |
|---|---|---|---|
| 2612796 | 11/1976 | Fed. Rep. of Germany | 110/214 |
| 3038875 | 3/1982 | Fed. Rep. of Germany | |
| 3125429 | 2/1983 | Fed. Rep. of Germany | |
| 2078372 | 5/1971 | France | |
| 2316542 | 1/1977 | France | |
| 0050409 | 3/1991 | Japan | 110/214 |
| 0225106 | 10/1991 | Japan | 110/214 |

OTHER PUBLICATIONS

Patent of Abstracts of Japan; vol. 3, No. 144 (M-82) 28 Nov. 1979 & JP-54 120 423 (Kukota Tekko) 19 Sep. 1979.

Primary Examiner—Edward G. Favors
Attorney, Agent, or Firm—Armstrong, Westerman, Hattori, McLeland & Naughton

[57] ABSTRACT

A method of inhibiting formation of unburned substances in incinerating refuse is practiced with use of an incinerator wherein a peripheral wall defining a combustion chamber is provided with a nozzle for injecting at least one mixing fluid selected from the group consisting of air, water, water vapor, inert gas and combustion exhaust gas into the combustion chamber and producing a swirling stream of the fluid within the chamber. When the refuse is incinerated, the mixing fluid is injected into the combustion chamber from the nozzle, whereby the flame and unburned substances produced within the chamber are efficiently mixed with an excessive portion of air supplied to the chamber and remaining therein to ensure promoted complete combustion.

5 Claims, 13 Drawing Sheets

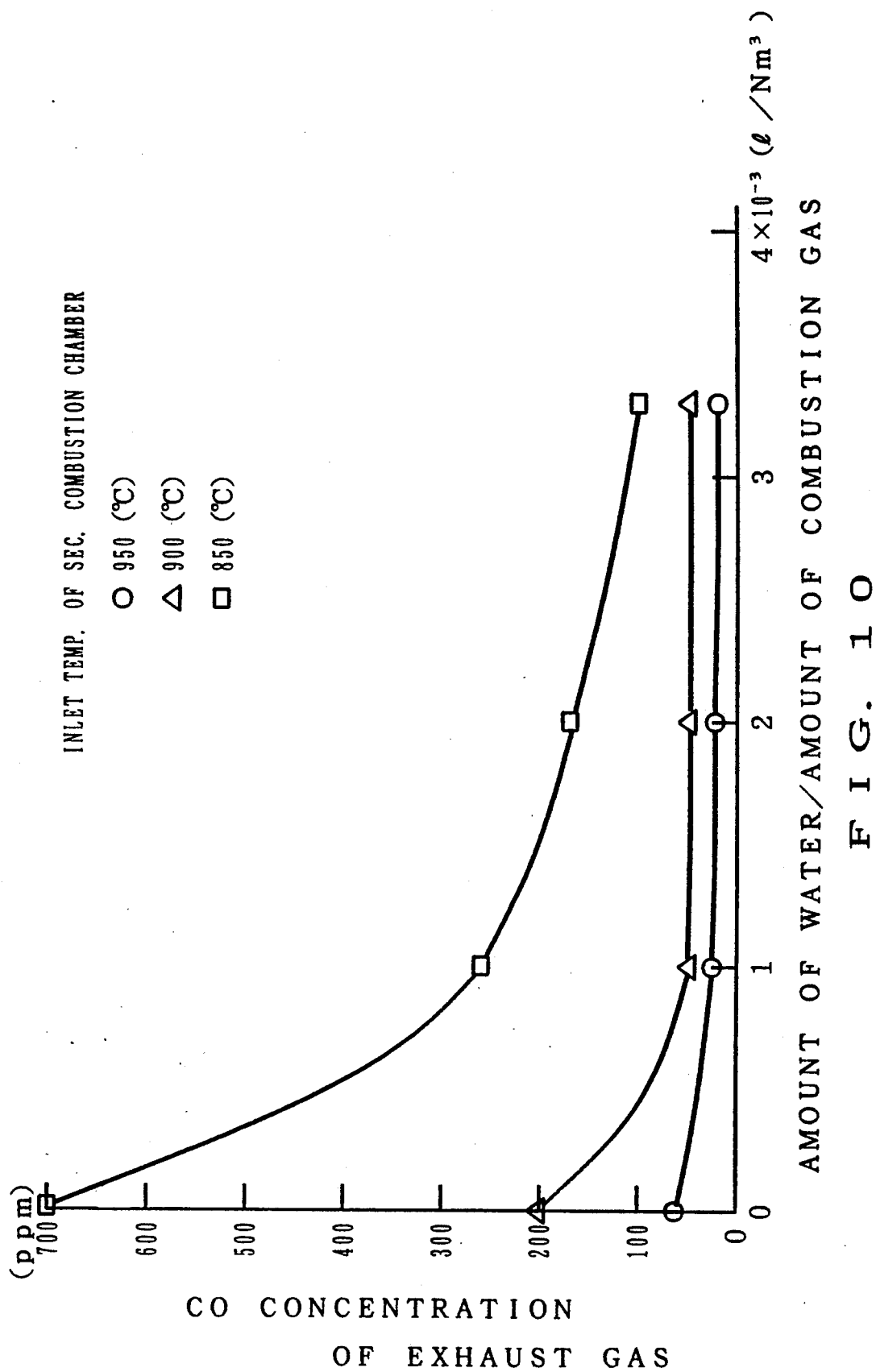

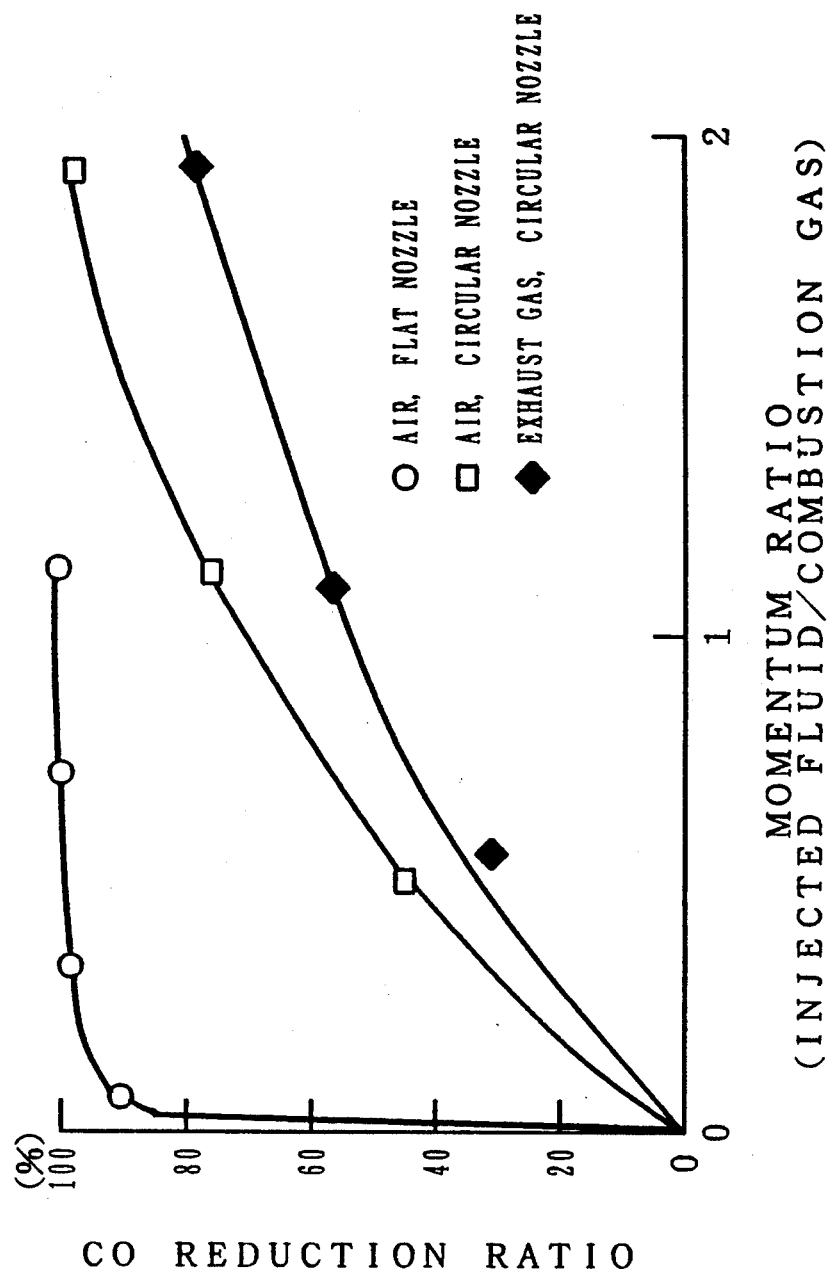

METHOD OF INHIBITING FORMATION OF UNBURNED SUBSTANCES IN REFUSE INCINERATOR, AND REFUSE INCINERATOR

This application is a continuation of application Ser. No. 07/795,871 filed Nov. 19, 1991 now abandoned.

BACKGROUND OF THE INVENTION

The present invention relates to a method of inhibiting formation of unburned substances, such as CO and hydrocarbon, in incinerators for incinerating municipal refuse, industrial wastes and the like, and to incinerators for use in practicing the method.

Throughout the specification and the appended claims, the right-hand side of FIGS. to 7 and FIG. 15 will be referred to as "front," the left-hand side thereof as "rear," the upper side of FIGS. 5 and 7 as "left" and the lower side thereof as "right."

Municipal refuse, industrial wastes and the like are incinerated using incinerators, for example, like the one shown in FIG. 15. With reference to this drawing, the refuse incinerator has in its interior a primary combustion chamber 10, a secondary combustion chamber 11 above the chamber 10, a gas discharge channel 2 for guiding a combustion gas produced in the secondary combustion chamber II to an unillustrated gas outlet, a stepped grate 13 disposed within the primary combustion chamber 10 and inclined forwardly downward, and a burner 14 provided at the rear side of the inclined grate 13 adjacent to the upper end thereof and obliquely directed forwardly downward. Although not shown, an exhaust heat recovery device and an exhaust gas cooling heat exchanger are arranged in the vicinity of the gas outlet of the gas discharge channel 12.

Refuse R is placed on the stepped inclined grate 13 within the primary combustion chamber 10 and burned by the burner 14 with primary air supplied from below the grate 13. A secondary air supply nozzle 15 extends through and is mounted on the front wall of the secondary combustion chamber 11.

The combustion gas resulting from the incineration of the refuse R passes through the gas discharge channel 12, and is cooled by passing through the unillustrated exhaust heat recovery device and the heat exchanger, then discharged from the gas outlet as a combustion exhaust gas and sent to an unillustrated exhaust gas treating apparatus.

The incineration of the refuse R involves the problem of locally increasing the temperature to produce NOx and clinker due to the fusion of ash. To obviate this problem, a nozzle 16 directed downward may be provided in an interior upper portion of the secondary chamber 11 for sprinkling cooling water downward.

However, the incineration of refuse with the incinerator encounters the following problem. Since the refuse to be handled in recent years has a higher calorific value, large quantities of volatiles are released from refuse R in the rearward portion of the primary combustion chamber 10 of the incinerator, forming flame F and combustion gas which ascend this portion of the chamber 10. The amount of primary air supplied from below the rearward portion of the grate 13 is nevertheless insufficient for the complete combustion of the large quanties of volatiles, causing incomplete combustion and permitting large amounts of unburned substances to ascend along with the flame F and combustion gas. While an excess of air needs to be supplied to the forward portion of the grate 13 from below in order to promote combustion of char resulting from the release of volatiles and to burn the unburned substances in ash, excessive air A not contributing to the combustion of the unburned substances in the ash ascends the forward portion of the primary combustion chamber 10. The flame F, unburned gas and excessive air A remain incompletely mixed even in the secondary combustion chamber 11, and the unburned gas is discharged as it is along with the combustion exhaust gas. The unburned gas contains a large amount of dioxin precursor, which forms highly toxic dioxin in the combustion exhaust gas, and the dioxin is released to the atmosphere.

SUMMARY OF THE INVENTION

The main object of the present invention is to overcome the foregoing problem and to provide a method of inhibiting formation of unburned substances in incinerating municipal refuse, industrial wastes and the like, and a refuse incinerator for use in practicing this method.

The present invention provides a method of inhibiting formation of unburned substances in a refuse incinerator. In incinerating refuse in the refuse incinerator, the method is characterized in that at least one mixing fluid selected from the group consisting of air, water, water vapor, inert gas and combustion exhaust gas is injected into a combustion chamber.

The present invention further provides a refuse incinerator characterized in that a peripheral wall defining a combustion chamber is provided with a nozzle for injecting at least one mixing fluid selected from the group consisting of air, water, water vapor, inert gas and combustion exhaust gas into the combustion chamber and producing a swirling stream of the fluid within the combustion chamber.

With the method of the invention, at least one mixing fluid selected from the group consisting of air, water, water vapor, inert gas and combustion exhaust gas is injected into the combustion chamber of the refuse incinerator, so that the flame and unburned substances produced in the combustion chamber are efficiently mixed with excessive air supplied to the combustion chamber and remaining therein to promote complete combustion. This greatly reduces the amount of unburned substances contained in the exhaust gas and including a dioxin precursor to prevent formation of dioxin, consequently making it possible to release to the atmosphere an exhaust gas which is free from dioxin or contains only a trace of dioxin.

With the refuse incinerator of the present invention, the peripheral wall of the furnace defining a combustion chamber is provided with a nozzle for injecting at least one mixing fluid selected from the group consisting of air, water, water vapor, inert gas and combustion exhaust gas into the combustion chamber and producing a swirling stream of the fluid within the combustion chamber. Accordingly, the above method can be practiced easily by the incinerator.

The present invention will be described below in greater detail with reference to the accompanying drawings.

BRIEF DESCRIPTION OF THE DRAWINGS

FIG. 10 is a graph showing the relationship of the amount of water applied on atomization and the CO concentration, as established by Example 3;

FIG. 12 is a graph showing the relationship between the momentum ratio of injected fluid to combustion gas and the CO reduction ratio, as established by Example 5;

DESCRIPTION OF THE PREFERRED EMBODIMENTS

Figure 1:
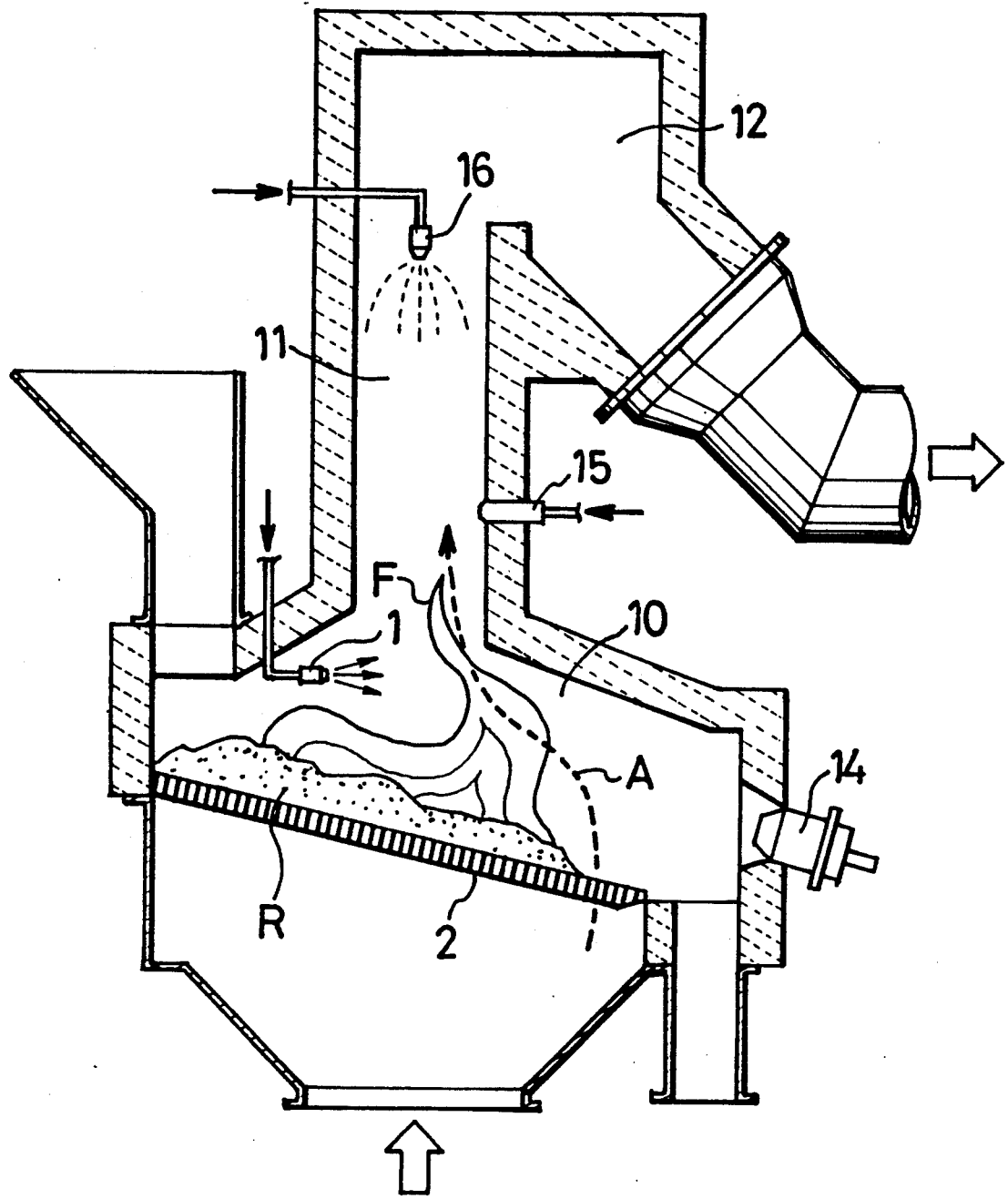
FIG. 1 is a view in vertical section showing a first embodiment of refuse incinerator.

Throughout FIGS. 1 to 7 and FIG. 15, like parts are designated by like reference numerals, and the parts corresponding to those already described with reference to FIG. 15 will not be described again.

Figure 2:
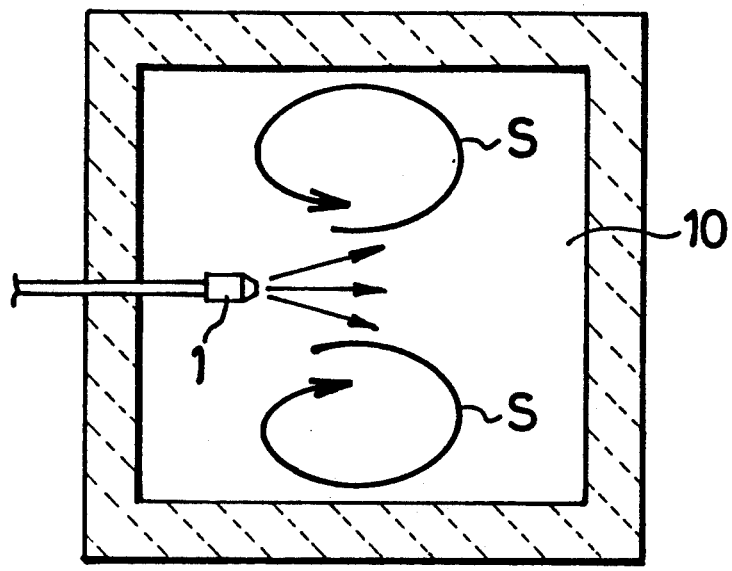
FIG. 2 is an enlarged view in horizontal section of the first embodiment.
Figure 3:
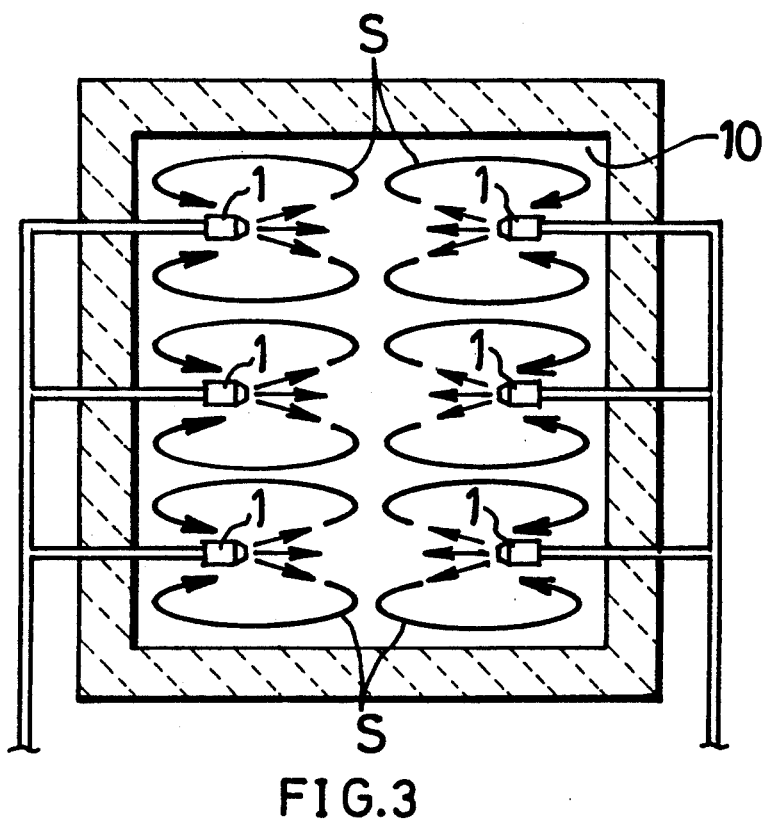
FIG. 3 is a sectional view corresponding to FIG. 2 and showing a second embodiment of refuse incinerator.

FIGS. 1 and 2 show a refuse incinerator as a first embodiment. Referring to these drawings, the primary combustion chamber 10 of the incinerator is provided at a rear portion thereof with a mixing fluid injection nozzle 1 having a forward end outlet which is oriented forward. The nozzle 1 to be used is, for example, a water nozzle for atomizing water with use of at least one high-pressure gas or vapor selected from the group consisting of air, water vapor, inert gas and combustion exhaust gas and applying the atomized water, nozzle for atomizing water without using any gas and applying the atomized water, or nozzle for injecting at least one gas or vapor selected from the group consisting of air, water vapor, inert gas and combustion exhaust gas.

The forward end outlet of the nozzle 1 is oriented at an angle, preferably within the range of ±45 degrees, more preferably within the range of ±30 degrees, upward and downward from a direction perpendicular to the direction of flow of the combustion gas (flame F) within the primary combustion chamber 10, e.g., from a horizontal direction. Further preferably, the end of the nozzle 1 is in a flat shape to provide the outlet orifice.

An inclined grate 2 disposed in the primary combustion chamber 10 is not stepped. The burner 14 is provided at the front side of the inclined grate 2 adjacent to the lower end thereof and obliquely oriented rearwardly upward.

In the incinerator thus constructed, refuse R is placed on the inclined grate 2 within the primary combustion chamber 10 and burned by the burner 14 with primary air supplied from below the grate 2. At this time, large quantities of volatiles are released from the refuse R in the rearward portion of the primary combustion chamber 10, forming flame F which tends to ascend the rearward portion of the chamber 10. While air is supplied form below the forward portion of the grate 2 in order to promote combustion of char resulting from the release of volatiles and to burn unburned substances in ash, an excessive portion A of the air not contributing to the combustion of the unburned substances in the ash ascends the forward portion of the primary combustion chamber 10.

At least one mixing fluid selected from the group consisting of air, water in the form of fine drops, water vapor, inert gas and combustion exhaust gas is injected from the nozzle 1 into the chamber 10 against the flame F at an angle within the range of ±45 degrees from a direction perpendicular to the flow of the flame F (combustion gas). The jet of fluid efficiently mixes the flame F and unburned substances with the excessive air A in the forward portion, and the mixture enters the secondary combustion chamber 11. At this time, swirling streams occur in the primary combustion chamber 10, ensuring promoted mixing. Examples of useful inert gases are $N_2$ and $CO_2$. A higher mixing efficiency is achieved when at least one of water in the form of fine drops and water vapor is present in other mixing fluid than when air, water vapor, inert gas or combustion exhaust gas is used singly.

Further when the fluid to be injected contains drops of water and/or water vapor, such water acts to cause the following water gas reaction.

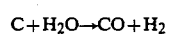

$C + H_2O \rightarrow CO + H_2$

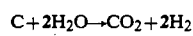

$C + 2H_2O \rightarrow CO_2 + 2H_2$

$CO + H_2O \rightarrow CO_2 + H_2$

This reaction reduces the amounts of soot and CO which are unburned substances. The water in the form of drops or water vapor further acts to lower the temperature in the vicinity of the flame F formed above the rearward portion of the grate 2, consequently inhibiting formation of NOx and also formation of clinker within the primary combustion chamber 10. This eliminates the need for the cooling water sprinkling nozzle 16. The fluid containing drops of water and/or water vapor is obtained by atomizing water using at least one gas or vapor selected from the group consisting of air, water vapor, inert gas and combustion exhaust gas. It is desirable to use at least one of air and water vapor.

Subsequently, secondary combustion is effected with secondary air supplied from the secondary air supply nozzle 15 to greatly reduce the amounts of unburned substances. The supply of secondary air from the nozzle 15 is not always necessary. In this case, the amount of air to be supplied from below the grate 2 should be not smaller than the amount of air stoichiometrically needed for the complete combustion of combustible substances expected to be produced.

FIG. 2 shows another refuse incinerator as a second embodiment. With reference to this drawing, a plurality of nozzles 1 are arranged in the right-to-left direction at each of the front and rear portions of the primary combustion chamber 10. The end outlets of the front nozzles 1 are oriented rearward, while those of the rear nozzles 1 are oriented forward. Each of the nozzles I in this arrangement produces swirling streams S within the primary combustion chamber 10. Alternatively, the chamber 10 may be provided, only at its front or rear portion, with a plurality of nozzles as arranged in the right-to-left direction. In these cases, nozzles may be arranged in a plurality of rows which are arranged one above another.

Figure 4:
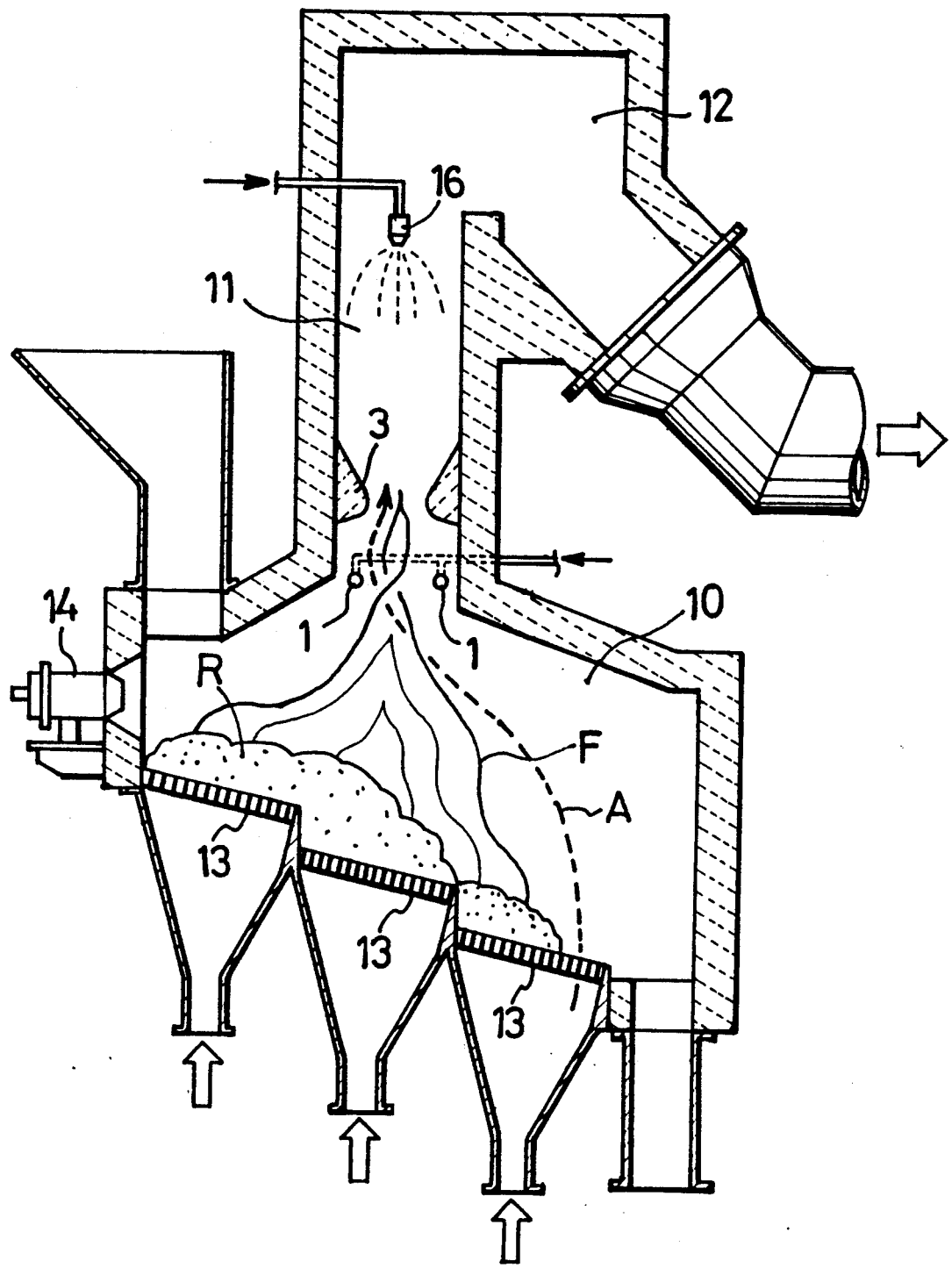
FIG. 4 is a view in vertical section showing a third embodiment of refuse incinerator.
Figure 5:
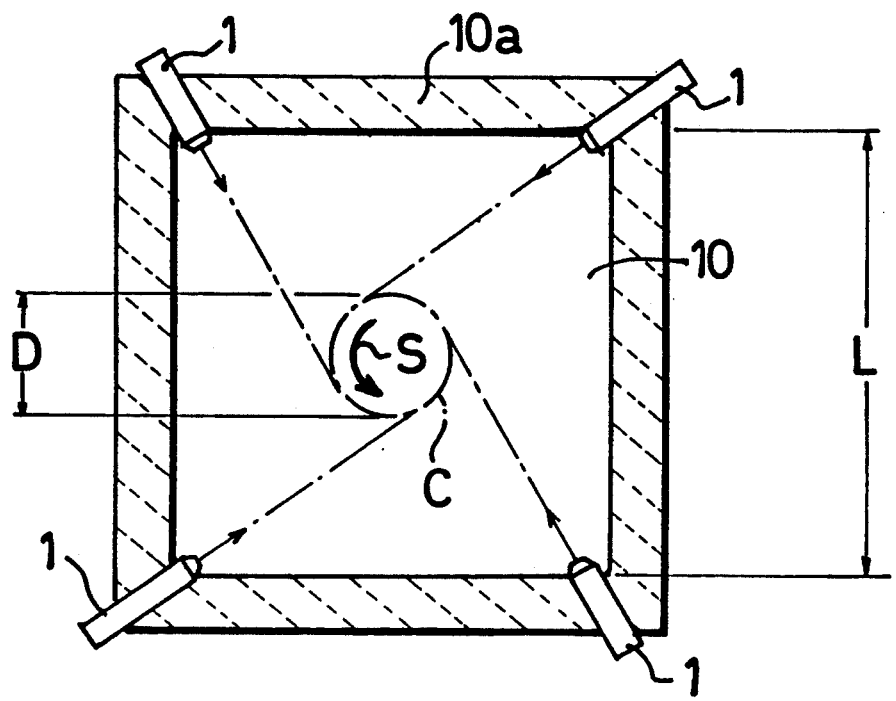
FIG. 5 is an enlarged view in horizontal section of the third embodiment.

FIGS. 4 and 5 show a third embodiment of refuse incinerator. With reference to these drawings, a plurality of, e.g., four, mixing fluid injection nozzles 1 are mounted on the peripheral wall 10a of primary combustion chamber 10 of the incinerator so that their end outlets are positioned in the same horizontal plane as a horizontal phantom circle C and oriented tangentially of the circle.

Suppose the primary combustion chamber 10 has a width L in the right-to-left direction, and the horizontal phantom circle C has a diameter D. The ratio of the width to the diameter, L/D, is then preferably in the range of 5 to 15, more preferably in the range of 5 to 12. The incinerator has a constricted portion 3 at a position downstream from the nozzles 1, for example, at an intermediate portion of height of the secondary combustion chamber 11. The constricted porion 3, when provided, produces disturbed agitated flows within the secondary combustion chamber 2, mixing the flame F and unburned substances with the excessive air more efficiently while inhibiting formation of uneven flows. Also with this incinerator, the outlet ends of the nozzles are oriented at an angle within the range, preferably of ±45 degrees, more preferably of ±30 degrees, upward and downward from a direction perpendicular to the direction of flow of the combustion gas (flame F), for example, from a horizontal direction.

When refuse R is to be incinerated in the primary combustion chamber 10 as placed on the inclined grate 13 which is stepped, the same mixing fluid as used in the first embodiment is injected from the nozzles 1 into the chamber 10 toward the horizontal phantom circle C tangentially thereof, whereby a swirling stream S is produced within the primary chamber 10 as seen in FIG. 5. The flame F formed above the rearward portion of the grate 13 as previously stated and unburned substances are efficiently mixed by the stream with excessive air A supplied to the forward portion of the grate 13 to promote complete combustion.

The flame F, unburned substances and excessive air A mixed together by the swirling stream enter the secondary combustion chamber 11, agitated into a disturbed flow by passing through the constricted portion 3 and further mixed together to undergo complete combustion more effectively, with formation of uneven flows inhibited.

Figure 7:
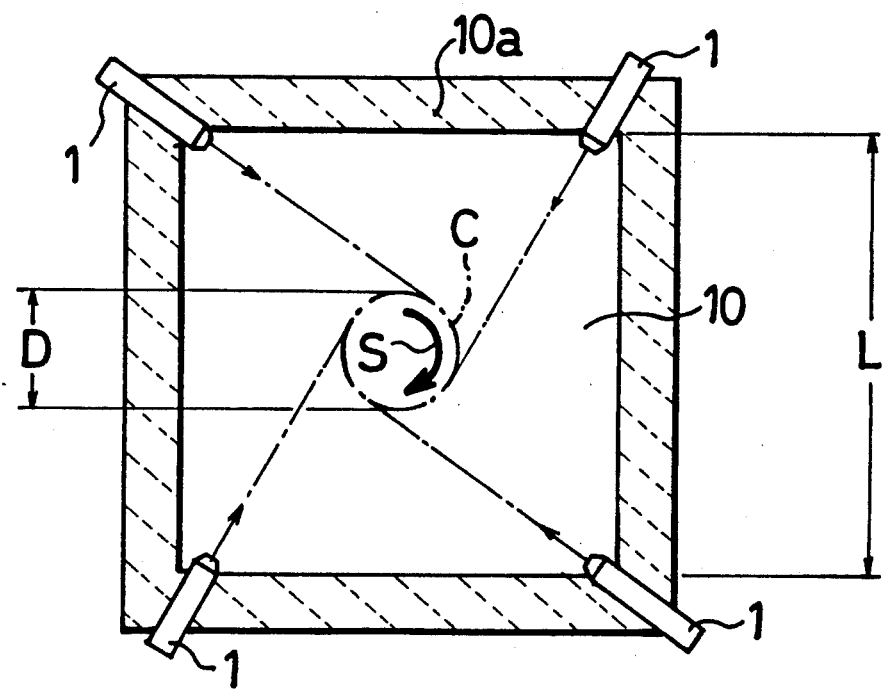
FIG. 7 is an enlarged view in horizontal section of the fourth embodiment.
Figure 6:
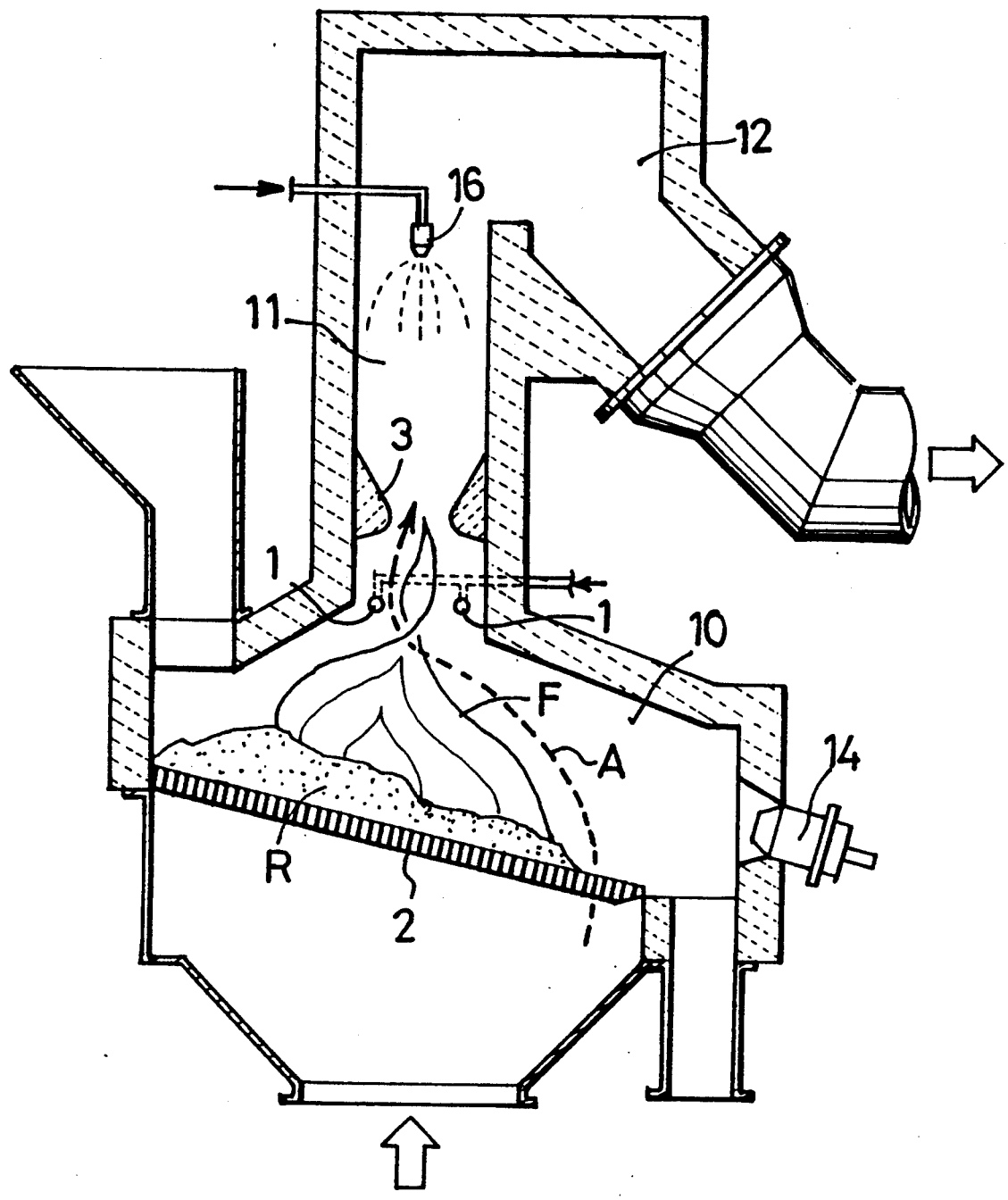
FIG. 6 is a view in vertical section showing a fourth embodiment of refuse incinerator.

FIGS. 6 and 7 show a fourth embodiment of refuse incincrator. With reference to these drawings, the peripheral wall 10a of primary combustion chamber 10 of the incinerator is provided with nozzles 1 which are so oriented that the swirling stream S produced flows in a direction reverse to the direction of stream shown in FIG. 5. The inclined grate 2 is stepless, and the burner 14 is disposed in the same manner as in the first embodiment. Formation of unburned substances is inhibited in this incinerator in the same manner as in the third embodiment.

The third and fourth embodiments described have four nozzles 1 with the outlet ends thereof positioned in the same horizontal plane as the single horizontal phantom circle C and oriented tangentially thereof. However, this arrangement is not limitative. The nozzles may be oriented at an angle within the range of ±45 degrees upward and downward from a direction perpendicular to the direction of flow of the combustion gas (flame F), for example, from a horizontal direction. Further the phantom cicle C need not always be horizontal.

Although the third and fourth embodiments have four nozzles 1, the number of nozzles is not so limited.

The first to fourth embodiments are incinerators of the type having an inclined grate, whereas the invention can alternatively be embodied as refuse incinerators having a grate of any other type such as a rotary grate or as refuse incinerators having no grate.

EXAMPLES

The present invention will be described with reference to the following examples.

EXAMPLE 1

Refuse was incinerated in the incinerator of the first embodiment while injecting air, water vapor, $N_2$ gas, a mixture of air and water, or a mixture of water vapor and water into the incinerator from the nozzle 1. The CO concentration and dioxin concentration of the exhaust gas were measured at points of different heights within the secondary combustion chamber 11. For the incineration, air was supplied from below the grate 2 at least in an amount stoichiometrically required for the complete combustion of combustible components expected to be formed. Further for the incineration, the inlet temperature of the secondary combustion chamber 11 was set to 920° to 940° C., and the oxygen concentration of the exhaust gas to 7%.

COMPARATIVE EXAMPLE 1

Figure 15:
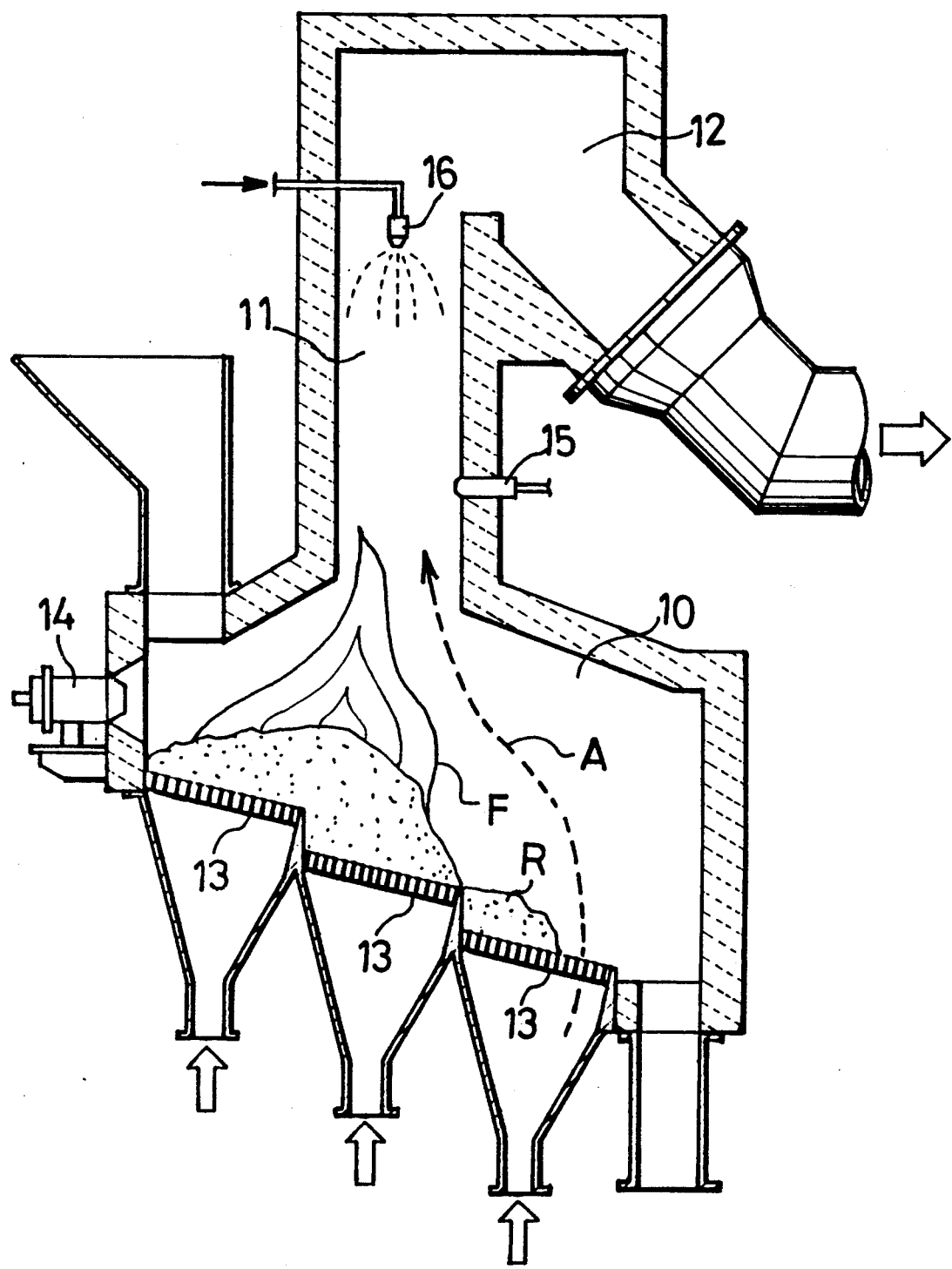
FIG. 15 is a view in vertical section showing a conventional refuse incinerator.

Refuse was incinerated in the same manner as in Example 1 with the exception of using a refuse incinerator of the type shown in FIG. 15. The CO concentration and dioxin concentration of the exhaust gas were measured at points of different heights within the secondary combustion chamber 11. When measured, the inlet temperature of the secondary combustion chamber 11 was found to be 940° C.

Figure 8:
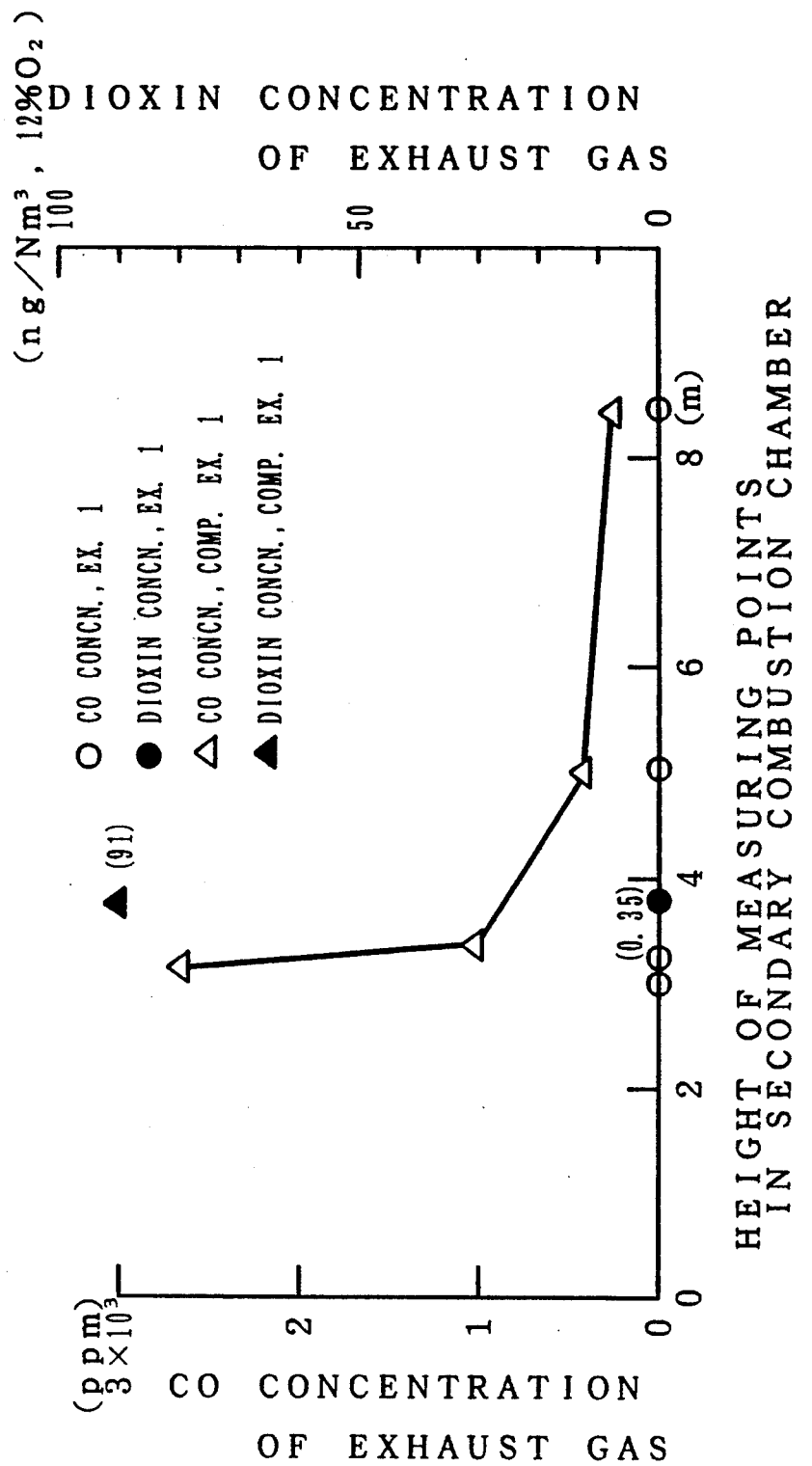
FIG. 8 is a graph showing the relationship of the height within the secondary combustion chamber to the CO concentration and dioxin concentration of the exhaust gas, as established by Example 1 and Comparative Example 1.

The results achieved by Example 1 and Comparative Example 1 are collectively shown in FIG. 8, which reveals that the method of the present invention produces the same effect by injecting the different fluids and results in a lower concentration of CO, an unburned substance, and much lower dioxin concentration than the conventional method. The values in the parentheses in FIG. 8 are dioxin concentrations.

EXAMPLE 2

Refuse was incinerated under the same conditions as in Example 1 in the incinerator while injecting a mixture of air and water from the nozzle 1, with the end outlet thereof oriented at varying angles with respect to a direction perpendicular to the direction of flow of the combustion gas (flame F) to determine the relationship of the angle to the CO concentration and HC concentration of the exhaust gas.

Figure 9:
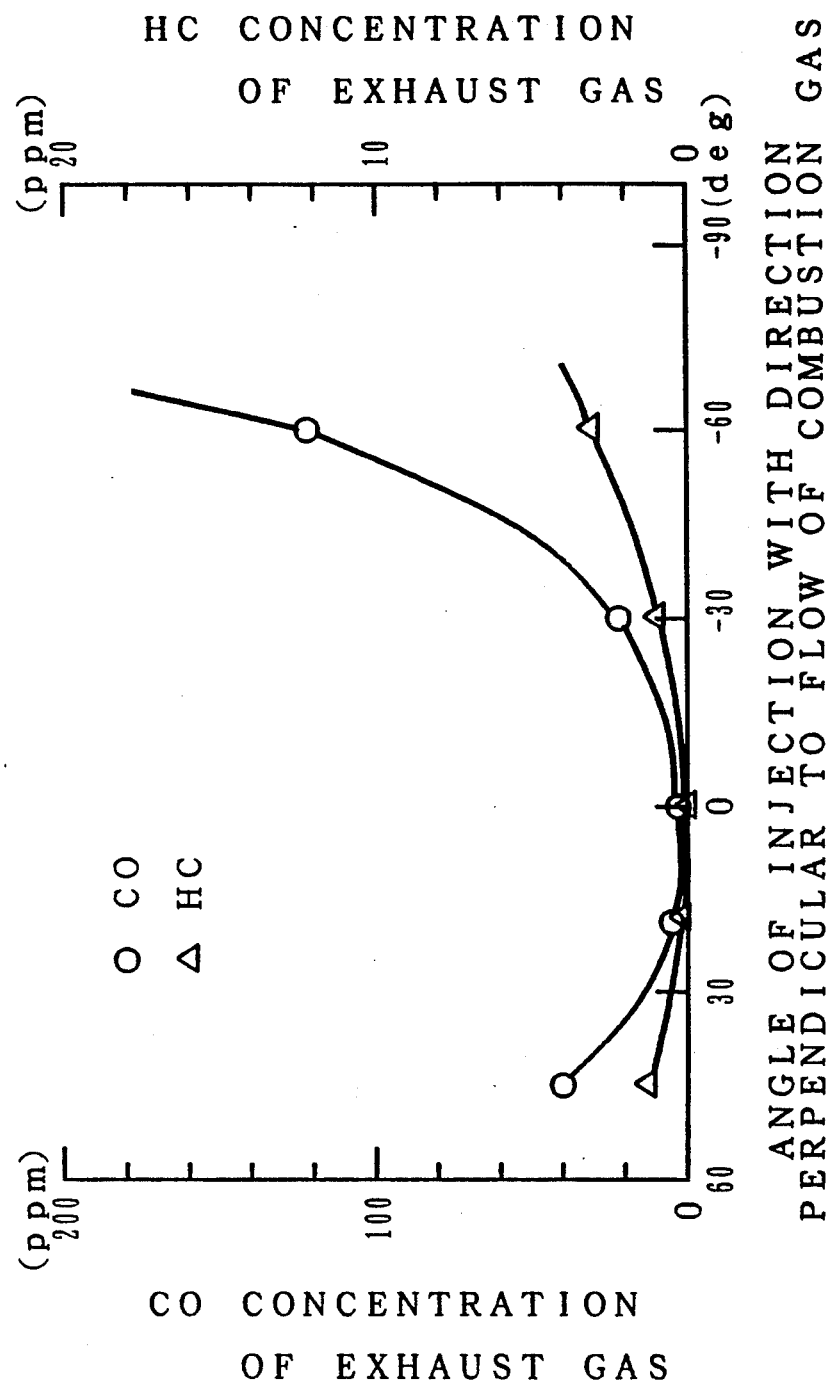
FIG. 9 is a graph showing the relationship of the angle of orientation of a nozzle end outlet to the CO concentration and HC concentration of the exhaust gas, as established by Example 2.

The result is shown in FIG. 9, which reveals that it is desirable to orient the end outlet of the nozzle 1 at an angle within the range of ±45 degrees, more desirably of ±30 degrees, upward and downward from the direction perpendicular to the direction of flow of the combustion gas.

We have also found that the same result as above can be achieved by the incinerators of third and fourth embodiments.

EXAMPLE 3

Refuse was incinerated at a rate of 4 tons/h in the incinerator of first embodiment, with the inlet temperature of the secondary combustion chamber 11 set to 850° C., 900° C. or 950° C., while injecting a mixture of air and water into the incinerator from the nozzle 1 of the high-pressure gas atomizer type to measure the CO concentration of the exhaust gas. The mixture was injected using high-pressure air (3.5 kg/cm$^2$G in pressure) at a rate of 80 Nm$^3$/h while varying the amount of water relative to the amount of combustion gas in the primary combustion chamber 10. For the incineration, air was supplied from below the grate 2 at least in an amount stoichiometrically required for the complete combustion of combustible components expected to be formed.

The result is shown in FIG. 10, which reveals that when the mixture of air and water is to be injected, the amount of water is preferably at least 0.5 liter per 1000 Nm$^3$ of combustion gas in the primary combustion chamber 10.

EXAMPLE 4

Refuse was incinerated in the incinerator of first embodiment, with the inlet of the secondary combustion chamber 11 set to varying temperatures of 800° to 950° C., while injecting into the incinerator water vapor (25 Nm$^3$/h), air (15 Nm$^3$/h), N$_2$ gas (15 Nm$^3$/h), combustion exhaust gas (45 Nm$^3$/h, low-pressure injection at 700 mm Aq), water (20 liters/h), air (15 Nm$^3$/h) and water (20 liters/h) in mixture, or water vapor (15 Nm$^3$3/h) and water (20 liters/h) in mixture. The CO reduction ratio (%) achieved was determined.

Figure 11:
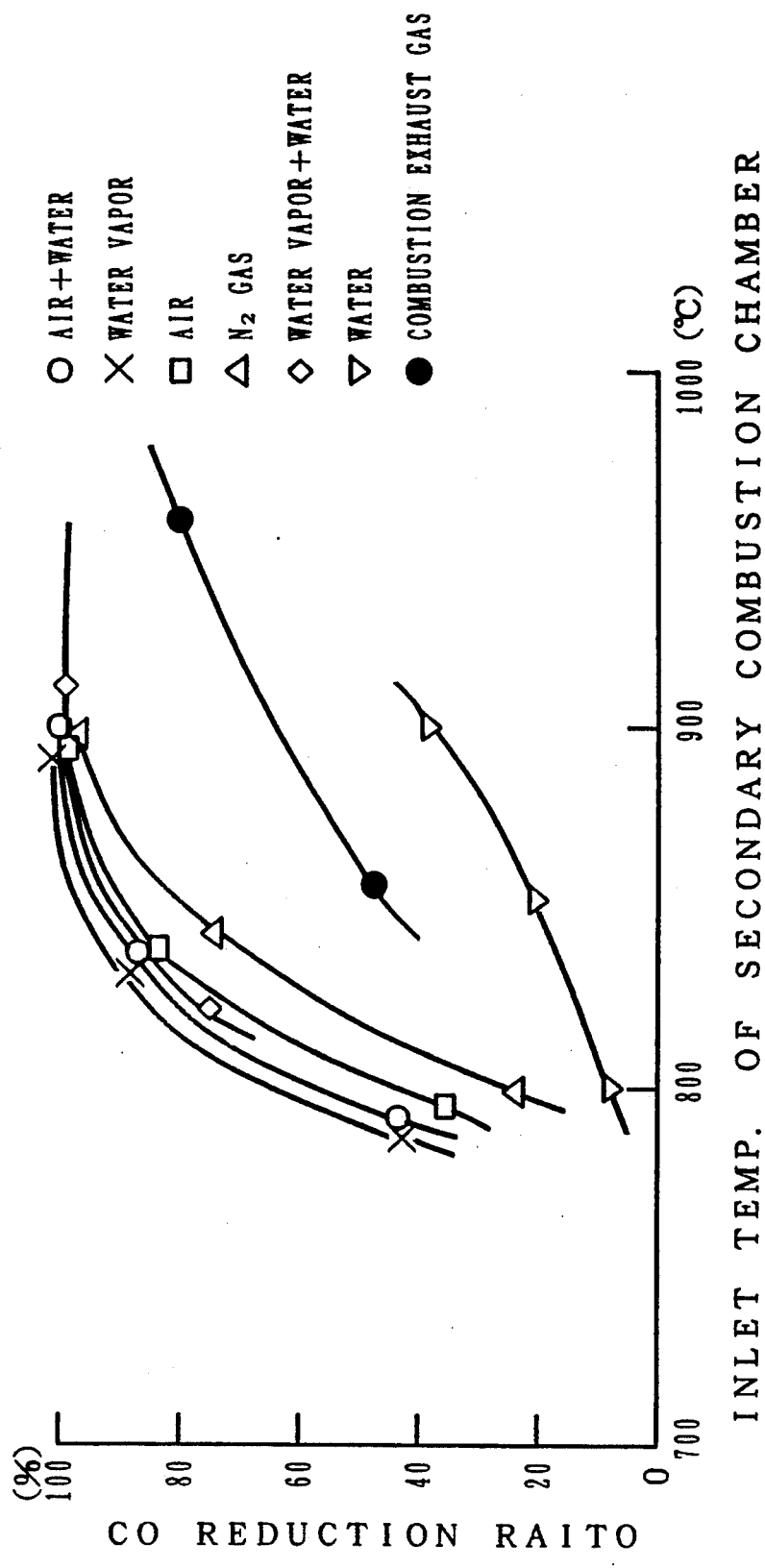
FIG. 11 is a graph showing the relationship between the inlet temperature of the secondary combustion chamber and the CO reduction ratio, as established by Example 4.

The result is shown in FIG. 11, which reveals that it is desirable to set the inlet of the secondary combustion chamber 11 to a temperature of at least 800° C., more desirably at least 850° C.

We have found that the same result as above can be achieved also by the incinerators of third and fourth embodiments. Especially in the case of the third and fourth embodiments, the same result is achieved using water vapor in a reduced amount, for example, of 15 Nm$^3$/h.

EXAMPLE 5

Refuse was incincrated in the incinerator of first embodiment, with the inlet temperature of the secondary combustion chamber 11 set to 950° to 970° C., while injecting a specified amount of air or combustion exhaust gas from a nozzle having a circular end outlet, or while injecting the specified amount of air from a nozzle having a horizontal flat end outlet, to determine the relationship between the ratio of the momentum (mass x flow velocity) of injected fluid to the momentum of the combustion gas within the primary combustion chamber 10 and CO reduction ratio (%).

The result is given in FIG. 12, which shows that the momemtum of the injected fluid is preferably at least 5% of the momemtum of the combustion gas. It is also seen that the nozzle preferably has a flat outlet.

We have found that the same result as above is achieved also by the incincrators of third and fourth embodiments.

EXAMPLE 6

Refuse was incinerated in the incinerator of first embodiment, with the inlet temperature of the secondary combustion chamber 11 set to 950° C., while injecting a specified quantity of air (15 Nm$^3$/h) into the incinerator at varying flow velocities to determine the CO reduction ratio (%) achieved.

Figure 13:
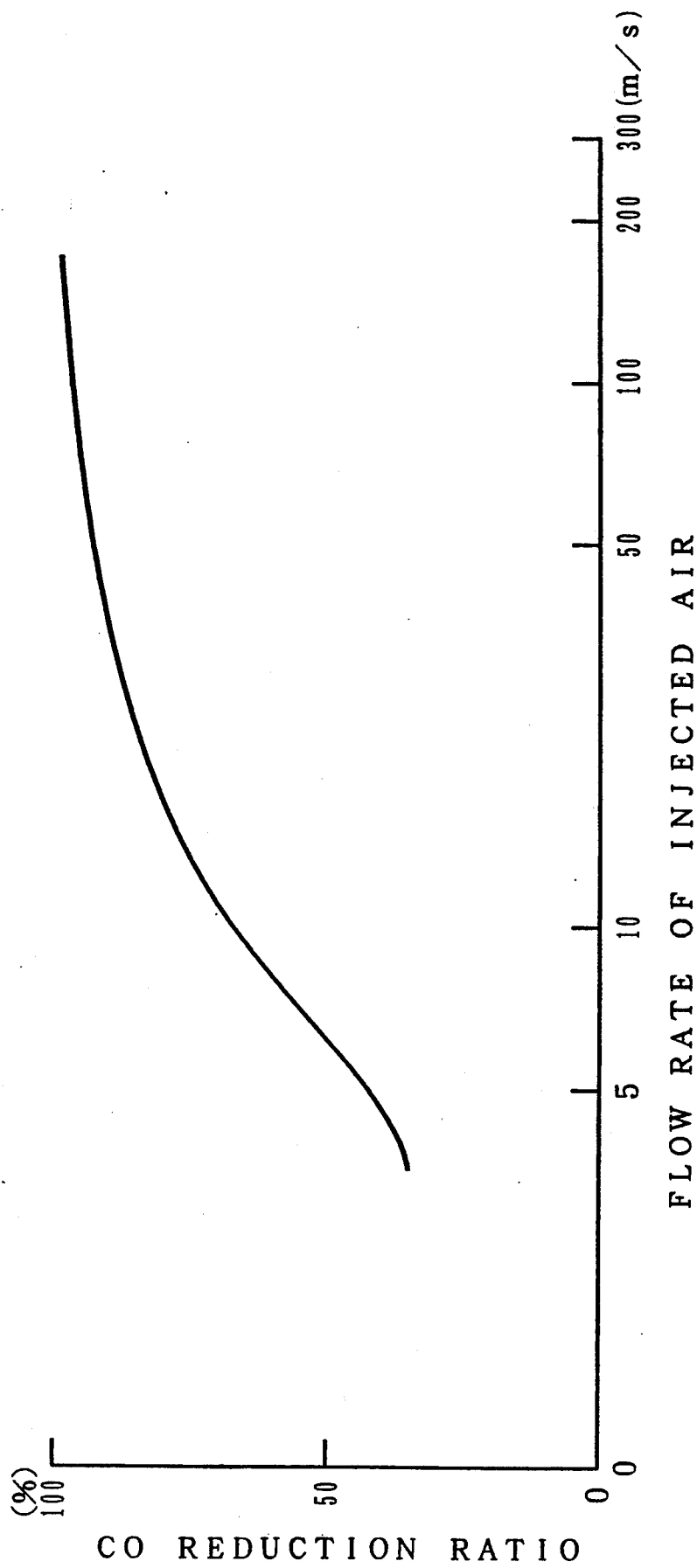
FIG. 13 is a graph showing the relationship between the flow velocity of injected fluid and the CO reduction ratio, as established by Example 6.

The result is given in FIG. 13, which shows that the higher the flow velocity of the injected fluid (air), the better is the result. Accordingly, a higher effect to reduce the CO concentration can be attained at an increased flow velocity of injected fluid by setting the inlet temperature of the secondary combustion chamber 11 to at least 800° C., preferably to at least 850° C., and giving increased momentum to the injected fluid. If, the amount of fluid to be injected is increased to give increased momemtum to the fluid, it becomes difficult to set the temperature to at least 800° C .

We have found that the same result as above is achieved also by the third and fourth embodiments.

EXAMPLE 7

Refuse was incinerated in the incinerator of third embodiment at varying L/D ratios wherein L was the right-to-left width of primary combustion chamber 10 of the incinerator, and D was the diameter of the horizontal phantom circle C to measure the CO concentration and HC concentration of the exhaust gas. For the incineration, one of air, water vapor, N$_2$ gas, mixture of air and water, and mixture of water vapor and water was injected into the incinerator from the nozzle 1.

COMPARATIVE EXAMPLE 2

Refuse was incinerated in the same manner as in Example 7 with the exception of using the conventional incinerator shown in FIG. 15 to measure the CO concentration and HC concentration of the exhaust gas.

Figure 14:
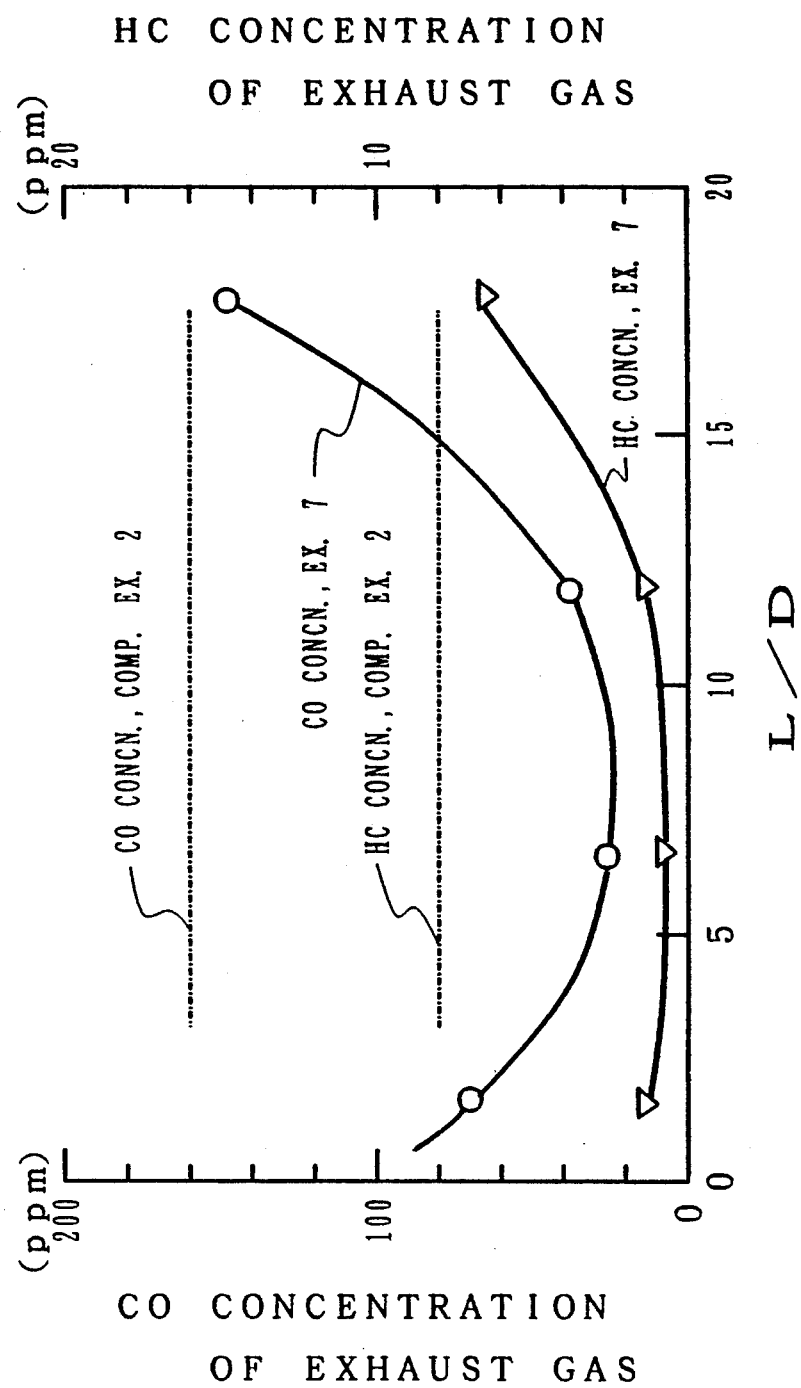
FIG. 14 is a graph showing the relationship between the ratio of the right-to-left width of the primary combustion chamber to the diameter of a horizontal phantom circle and the CO concentration and HC concentration of the exhaust gas, as established by Example 7 and Comparative Example 2.

The results achieved by Example 7 and comparative Example 2 are collectively given in FIG. 14, which shows that the use of the incinerator of the invention results in lower concentrations of unburned substances, i.e., of CO and HC, than when the conventional incinerator is used.

What is claimed is:

1. In a method for incinerating refuse in a refuse incinerator comprising:
    i) a primary combustion chamber, and
    ii) a secondary combustion chamber positioned above the primary combustion chamber and in communication therewith;

the improvement comprising inhibiting the formation of unburned substances in the incinerator by injecting into a constricted portion of the primary combustion chamber, adjacent to the secondary combustion chamber having a constricted portion, at least one mixing fluid selected from the group consisting of air, water, water vapor, an inert gas and a combustion exhaust gas, wherein the mixing fluid is ejected from at least three locations and directed toward a phantom circle targetially thereof.

2. A refuse incinerator comprising a primary combustion chamber and a secondary combustion chamber positioned above said primary combustion chamber and in communication therewith, said refuse incinerator having a constricted portion in said secondary combustion chamber provided near to said primary combustion chamber and having a peripheral wall of said primary combustion chamber which is provided with at least three nozzles for injecting at least one mixing fluid selected from the group consisting of air, water, water vapor, an inert gas and a combustion exhaust gas into said primary combustion chamber, said nozzle outlets being disposed tangentially to a phantom circle, thereby producing a swirling stream of said fluid within said primary combustion chamber.

3. A method as defined in claim 1, wherein the mixing fluid is water atomized with the use of at least one of air and water vapor.

4. A refuse incinerator as defined in claim 2, wherein the nozzle is a nozzle for atomizing water with use of gas or vapor.

5. A refuse incinerator as defined in claim 2, wherein the nozzle has a flat end outlet.

* * * * *

UNITED STATES PATENT AND TRADEMARK OFFICE
CERTIFICATE OF CORRECTION

PATENT NO.  : 5,313,895
DATED       : May 24, 1994
INVENTOR(S) : SEKIGUCHI et al.

It is certified that error appears in the above-identified patent and that said Letters Patent is hereby corrected as shown below:

On the cover page, Item [75], the last name of the second inventor "Saski" should read --Sasaki--.

On the cover page, Item [75], the last name of the sixth inventor "Knodo" should read --Kondo--.

Signed and Sealed this

Eleventh Day of October, 1994

Attest:

BRUCE LEHMAN

*Attesting Officer*     Commissioner of Patents and Trademarks